United States Patent
Afek et al.

(10) Patent No.: US 6,633,860 B1
(45) Date of Patent: Oct. 14, 2003

(54) METHOD FOR FAST MULTI-DIMENSIONAL PACKET CLASSIFICATION

(75) Inventors: Yehuda Afek, Hod Hasharon (IL); Anat Bremler, Holon (IL); Sariel Har-Peled, Tel Aviv (IL)

(73) Assignee: Ramot At Tel Aviv University Ltd., Tel Aviv (IL)

( * ) Notice: Subject to any disclaimer, the term of this patent is extended or adjusted under 35 U.S.C. 154(b) by 0 days.

(21) Appl. No.: 09/549,599

(22) Filed: Apr. 14, 2000

Related U.S. Application Data
(60) Provisional application No. 60/130,487, filed on Apr. 22, 1999.

(51) Int. Cl.$^7$ .................................................. G06N 5/04
(52) U.S. Cl. .......................................... 706/45; 705/37
(58) Field of Search ............................ 706/45; 378/54; 705/51, 37

(56) References Cited

PUBLICATIONS

Eppstein, David, et al, Internet Packet Filter Management and Rectangle Geometry, 12th ACM–SIAM Symp. Discrete Algorithms, Washington, 2001, pp. 827–835.*

Schwartz, Daniel B., ATM Scheduling With Queuing Delay Predictions, SIGCOMM'93 Conference Proceedings on Communications Architectures, Protocols, and Applications, 1993, pp. 205–211.*

* cited by examiner

*Primary Examiner*—Wilbert L. Starks, Jr.
(74) *Attorney, Agent, or Firm*—Mark M. Friedman (57) ABSTRACT

A simple and fast algorithm for multi-dimensional packet classification by solving the best matching filter problem. The substantial part of the algorithm includes the search of filters being concurrently stabbed by the packet using a KD-tree data structure. Another aspect of the present invention includes the classification of the packet according to its destination address using a second data-structure which preferably consists of a one dimensional segment tree. In a preferred embodiment of the present invention, the packet is first classified according to its protocol type, then the packet is classified according to its destination address using a one dimensional segment tree data structure, and finally, a 6 dimension KD-tree is used to find the filters being stabbed by the remaining 3 parameters of the packet. Among the filters, which comply with the packet, the filter which applies to the packet is the filter with the highest predetermined priority. Theoretical analysis predicts and experimental results verify that in practice, the proposed data-structure can handle a lot of "difficult" filters quickly and efficiently.

17 Claims, 5 Drawing Sheets

METHOD FOR FAST MULTI-DIMENSIONAL PACKET CLASSIFICATION

This application claims benefit of provisional application 60/130,487 filed Apr. 22, 1999.

FIELD AND BACKGROUND OF THE INVENTION

The present invention relates to data classification in general, more particularly to a method for classifying a datum according to a set of filters and more specifically: to a method for classification of packets of information traveling across networks.

Due to the explosive use of networking (i.e. the Internet) in recent years, and with the advance of firewalls and service differentiation, there is an increased demand to build fast message filters machines (routers) that can filter packets according to data at various fields in the packet's header at very high throughputs.

The filtering enables the routers to decide which packet to block, which to forward and at what priority, how much to charge the flow and what service to provide to each packet i.e., on which queue to place the packet. The starting point is the problem description and setup is given by V. Srinivasan, G. Varghese, S. Suri, and M. Waldvogel, "*Fast and scalable layer four switching*", in Proc. ACM SIGCOMM 98, September 1998.

Each router has a set of filters by which packets should be filtered. Each filter consists of a set of K value-ranges. Each value-range specifies a range of values that are acceptable for a certain parameter in the packet header. A value-range is either exact, a range or star (*).

Exact value range specifies that the corresponding packet parameter has to exactly match the value given in the value-range. Exact range may be used for example to block packets coming from a particular source. A range value-parameter specifies a range of values in which the corresponding packet parameter should reside. A range value may be used to block packets arriving from a subnet. The range may be specified as a prefix or as a minimum and maximum values. A star (*) value-range specifies don't care, i.e., the corresponding packet parameter may have any legal value.

Each message doing through the classifying machine has several parameters by which it is classified such as: destination address, source address, destination port number, source port number and protocol type. This information is contained in fields in the packet header. The classifier has a large set of filters; each one specifies a valid (acceptable) range of values for each of the message's parameters in the packet header.

A packet matches a filter only if the value in each field of the packet complies with the corresponding value range in the filter.

Besides, filters are ranked according to a pre-determined priority. If a packet matches several filters, the highest priority filter it matches, is the filter which applies to the packet.

The specific classification problem for packets on the net is relatively new, but its relevance is increasingly growing because of the exponential increase of traffic across the net. The best matching filter problem can be stated as a problem in computational geometry. Each filter specifies a K dimensional axis parallel box, and each packet with K parameters defines a point in K dimensions. The corresponding computational geometry problem is as follows: given a point and a set of axis parallel boxes in K dimensions, find the highest priority box in which the point resides. This problem is known as the Stabbing Query Problem in computational geometry. It was described by: M. de Berg, M. van Kreveld, and J. Snoeyink, "*Two and three-dimensional point location in rectangular subdivisions.*", in J. Algorithms, 18, 256–277, 1995.

The present art with regard to mechanisms for solving such classification problems is described by: T. V. Lakshman and D. Stiliadis, "*High speed policy-based packet forwarding using efficient multidimensional range matching*", in Proc. ACM SIGCOMM 98. September 1998, and by: Srinivasan et al., 1998. Both references deal with the best matching filter problem and provide efficient solutions to filtering packets according to two fields in the two dimensional case.

The time it takes to solve the best matching filter query problem in Srinivasan et al., 1998 is proportional to w, while using nw size memory, where w is the number of bits in a value (e.g., an IP address) and n is the total number of filters. The time it takes the hardware 30 solution suggested in Lakshman et al., 1998 to solve the two dimensional case, is proportional to (w+log n) and it requires O(n) space. Note that logarithms herein are base 2 logarithms.

When packet classification is performed on more than 2 parameters tile solutions provided by these papers are not as attractive. The multi-dimensional solution in Srinivasan et al., 1998 suggests to maintain a cross product table, each entry of which corresponds to a set of packet headers that comply with exactly the same subset of filters. An arriving packet is independently and separately classified according to each of its header fields to give it the K coordinates in the cross product table.

If that table entry is in the cache, classification is done. If however that entry is not in the table, a linear search costing O(nK) time is used. The full size of the cross product table is $d_1 \cdot d_2 \cdot \ldots \cdot d_n$, where $d_i$ is the number of different value-ranges in the i's dimension, i.e., the number of filters with different value-ranges in the i's coordinate.

The solution of Lakshman et al., 1998 is in hardware and requires O(n) steps in the multi-dimensional case. Being a hardware solution it is inflexible, and hard to adapt to changes in the filters, which is a must in networking today.

Applications that rely on packet filtering may add and remove new filters many times during operation. For example, in a network that supports QoS (Quality of Service), a new filter is added to the routers along a path of a new flow that has particular QoS requirements. Therefore, we cannot rely on having all the filters preprocessed and present in a large cross product table stored in memory, or in hardware.

The 2 dimensional solution is not always satisfactory since there may be situations that a value-range of ranges is used in more than 2 values of the filters. For example in virtual networks it may be wanted to allow traffic from a range of sources to a range of destinations over a range of ports and protocols to go through the routers of our virtual private network.

In the general case, for filters with K dimension, the set of n filters is represented as:

filter 1: $[l_1^1, r_1^1] \times \ldots \times [l_K^1, r_K^1]$
filter 2: $[l_1^2, r_1^2] \times \ldots \times [l_K^2, r_K^2]$
filter n: $[l_1^n, r_1^n] \times \ldots \times [l_K^n, r_K^n]$ where the l and the r are the lower and the upper boundaries respectively of the filter in the appropriate dimension.

The packet is considered to be a point in K dimensions. The parameters of the packet received are: $(\upsilon_1, \upsilon_2, \ldots \upsilon_K)$. These are called the coordinates of the packet.

The problem is then to find the highest priority filter in which the packet's parameters reside, i.e.: the highest priority filter, j such that: $[l_1^j \leq v_1 \leq r_1^j]$ and ... and $[l_K^j \leq v_K \leq r_K^j]$ The packet satisfying these inequalities is said to stab filter j. To solve the problem of the filters being stabbed by the packet, several methods have been suggested which are briefly described below:

a. Linear Scan

Figure 2A:
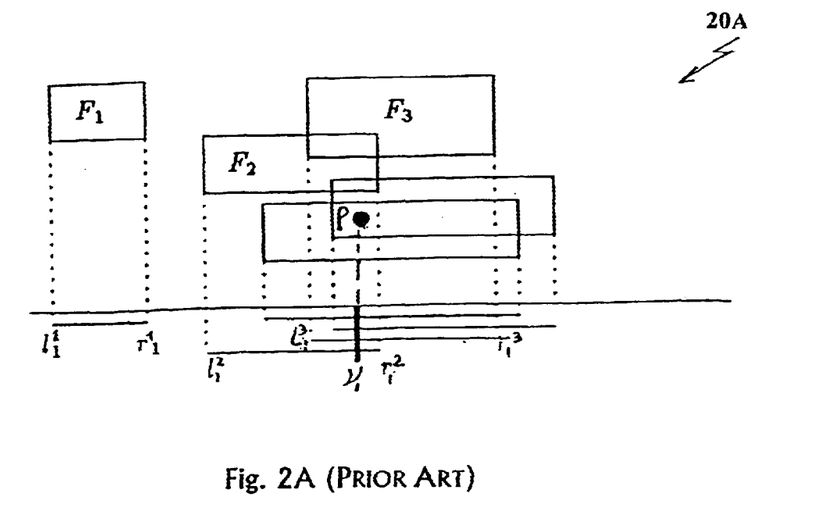
FIG. 2A (prior art) shows filters, which match a packet in 1 dimension.

The most straightforward approach to solve the problem is to sort the filters in decreasing order of priority. A query is then carried out by scanning all the filters in the sorted order, each one in all dimensions, until the first filter that the packet stabs in all the dimensions is found. Such a solution requires linear space, linear O(Kn) query time, and at most O(log n) time to add a new filter to the sorted list. Another naive approach is to first find all the filters that the packet matches only in the first parameter, i.e., all the filters such that $[l_j \leq v_j \leq r_j]$. Namely, all the filters that the packet stabs in the first coordinate. This is shown in FIG. 2A to which reference is now made. The next step is to solve the problem in K-1 dimension (e.g. using the mentioned Linear scan) on those subset of "candidate" filters which have been stabbed wherein, in the resulting subproblem the first parameter call be ignored reducing the dimension of the problem by one.

Figure 2B:
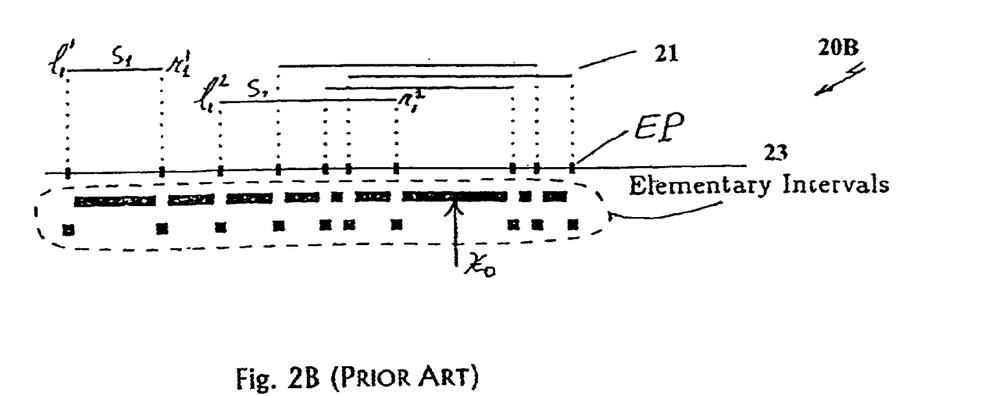
FIG. 2B (prior art) shows the construction of elementary intervals in 1 dimension.

To find all the filters stabbed by the packet first coordinate, the following operation and data structure (which belong to prior art) are defined:

a. 1. One Axis Projection:

Let EP be the set of all the beginnings and ends of value-ranges in one coordinate of a filter, as shown in FIG. 2B to which reference is now made, i.e.:

$$EP = \{l_1^1, r_1^1, l_1^2, r_1^2, \ldots l_1^n, r_1^n\}$$

Next, the elementary intervals that this set of points define are considered. An elementary interval is either the maximal interval between two points in EP such that no other point of EP lies in its interior, or, it is a point of EP.

There are at most 4n−1 elementary intervals defined by the 2n points of the projection on one axis. I.e., let $\{I_1, I_2, \ldots I_m\}$ be the result of sorting the elements of EP in increasing order. Then the elementary intervals shown in FIG. 2B are: $\{[I_1, I_1], (I_1, I_2), [I_2, I_2], (I_2, I_3), \ldots [I_m, I_m]\}$, $m \leq 4n-1$ since some points in EP may be equal).

The important property of an elementary interval is that all the values in this interval stab exactly the same subset of filters in the corresponding coordinate. Therefore, with each elementary interval we associate the subset of filters that are stabbed in this coordinate by values in this interval.

In particular, the first stage of the search is performed by locating the elementary interval on the first axis that contains the first coordinate of the packet. Here are three possible ways to locate the elementary interval that is stabbed by the packet in the first coordinate:

a. 1.1 Binary search: A binary search is performed over the set of 2m−1 elementary intervals. This takes O(log n) time. If however, with each elementary interval we store the list of filters that this interval stabs, the overall space required is in the worst case O(mn).

a. 1.2 Segment tree: Segment tree is a balanced binary tree over the elementary intervals. It facilitates a similar binary search. However its overall space requirement is only O(n log n). to store the lists of filters associated with each interval. Segment tree is described later in more detail. The list of filters associated with each elementary interval is implicitly stored in the data-structure, this is described by: J. L. Bentley, "*Solutions to Klee's rectangle problems*", in Technical report, Carnegie Mellon Univ., Pittsburgh, Pa., 1977.

a. 1.3 Best matching prefix. Since all the values in this problem are discrete each elementary interval can be presented as a disjoint union of 2W prefix intervals, where W is the logarithm of the maximum value in the first coordinate, see Srinivasan et al., 1998. A prefix interval is specified by a binary string s and it contains all the values such that s is the prefix of their binary representation. In Srinivasan et al., 1998, a method is given to represent all the axis elementary intervals as prefix intervals. This is achieved by blowing up the number of elementary intervals by at most 2W.

Interpreting the packet coordinate in the first axis as a binary string the prefix interval it stabs is computed in O(log W) time as described by: M. Degermark, A. Brodnik, S. Carlsson, and S. Pink, "*Small forwarding table for fast routing lookups.*", in Proc. ACM SIGCOMM 97. October 1997.

The space requirements of this scheme is similar to that of the binary search in the worst case, it is O(mn) (to store the lists of filters associated with each elementary interval).

Given the elementary interval $I_{98}$ stabbed by the packet first coordinate the packet Filtering can be completed by searching over the set of filters associated with $I_v$, (i.e., the filters that are associated with that elementary interval).

One option is to perform the search linearly, however more efficient methods are presented below:

b. K dimensional Packet Indexing: Let the index in the first dimension of packet P be the index of the elementary interval in the first coordinate that this packet stabs. This index is denoted by $i_1(P)$. For packet P we can repeat this process K times once for each of the K coordinates, resulting in a K element vector: $(i_1(P), i_2(P) \ldots i_K(P))$.

Figure 3A:
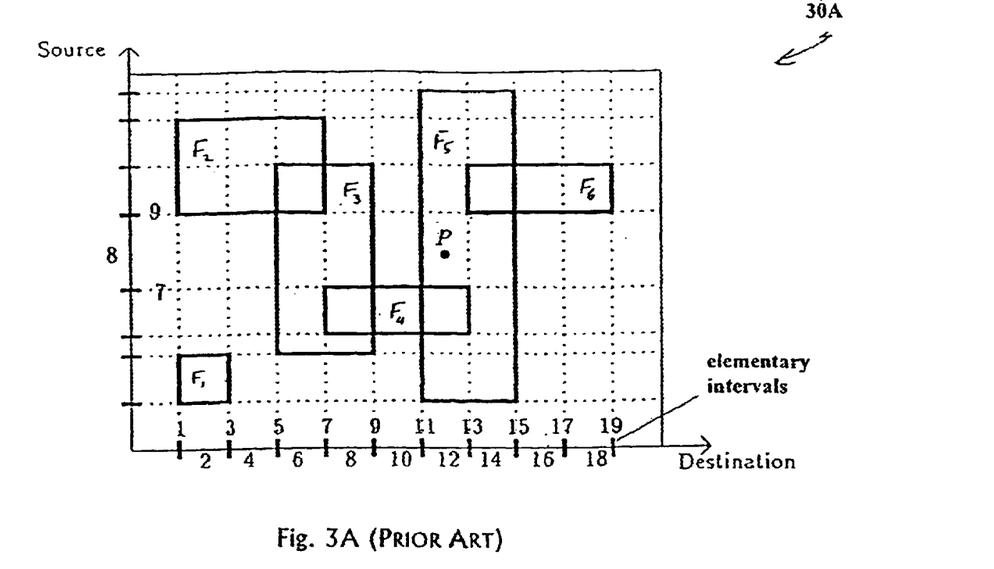
FIG. 3A (prior art) shows packet indexing in 2 dimensions.

This is the packet signature. Packet signature of a packet in two dimensions is shown in FIG. 3A to which reference is now made, where the signature of packet P is (12,8).

The time to compute the packet signature in K dimension is O(K log W) or O(K log n) depending on the method used. In Srinivasan et al., 1998, it is proven that all the packets that have the same signature are mapped to the same filter. It was also suggested there to use cacheing by signature to facilitate packet classification.

Even for a small number of parameters and filters, the resulting table of al possible signatures is too large to fit into primary or secondary mentors devices (consider for example 4 coordinates: source destination port, and protocol-type each inducing 20.000, 20,000.100. 3 elementary intervals, respectively. This combination results in a cache of size $12 \cdot 10^{10}$. This implies to a certain extent that even with the usage of hashing and cacheing the hit rate might be too low to be of practical use.

Furthermore, if the signature of a packet is not present in the cache we have to compute its classification from scratch. Namely, this approach only serves to delay the problem but does not provide a solution to the original problem.

For the general case, when the packet index is not in the cache, and no special properties of the packet can be used to reduce the problem into two dimensions the best method suggested in Srinivasan et al., 1998. is to perform a linear search over the relevant filters. This, in the worst case might cost O(Kn) time. This is perhaps acceptable today when the usage of QoS and or large firewalls is not that common, however we expect it to change in the near future. In particular, the ability to efficiently) handle the general case for a large number of filters will be a critical requirement.

Moreover, it is not clear how such a set of filters will look like in the future. i.e., how many parameters and over what value ranges.

c. Multi dimensional Segment-tree. The general packet classification problem was solved in computational geometry, e.g. by: M. de Berg, M. van Kreveld, M. Ovvermars, and O. Schwaarzkopf, in "*Computanional Geometry: Algorithm and applications*", Springer-verlag, 1997. were it was referred to by M. de Berg et al., 1995 as: the stabbing query problem.

The best theoretical solution takes $o(\log^K n)$ time. It uses multi-dimensional segment trees and requires $O(n \log^k n)$ space. While asymptotically, for n going to infinity and constant K this is considered a good solution, for the typical values of n and K in the packet classification context there are better and practical solutions. Specifically this solution is impractical for the K and n values that are typical in our problem (K between 4 and 6 and n more than a hundred).

d. KD-tree. There are alternative solutions in computational geometry to the stabbing query problem whose query time is sub-linear in the number of filters, n. Although never applied before to packet classification, these solutions are expected to provide practical alternatives With acceptable performances when applied in this context.

One of these solutions actually solves the problem by converting it into its dual problem, called orthogonal range searching. In the dual problem there are given n points in 2K dimensions, and the query is to compute which of the points lies inside a given axis parallel box. A data-structure used to solve this problem is known as the KD-tree (M. de Berg et al., 1997). It requires linear space O(Kn) and can answer a query in $o(n^{1-1/2K})$ time.

While KD-trees are simple, efficient, and are "guaranteed" to perform better than the naive linear-scan algorithm, this is a far cry from the theoretically exciting bounds provided by multi-dimensional segment trees (J. L. Bentley, 1977. M. de Berg et al., 1997), especially for K=1, 2.

To sum up: multi-dimensional Segment trees provide excellent solution to the problem for K=1.2, but for larger values of K, both their space and query time become unacceptable. On the other hand, KD-tree which provides general good performances for K $\leq$6, are not expected to performs as good as the segment tree for K=1. 2.

It is therefore a widely recognized need for an algorithm, which would overcome the disadvantages of presently known methods as described above that quickly (sub-linearly) classifies a packet with a relatively large number of parameters (e.g., 5, or 6) while requiring a near linear amount of space.

SUMMARY OF THE INVENTION

In this invention we present a simple and fast algorithm for multi-dimensional packet classification, solving the best matching filter problem.

Our simulated results demonstrate that in practice, our proposed data structure can handle a lot of "difficult" filters quickly and efficiently.

We provide a general method for classifying a packet according to a set of filters which comprises the steps of: (a) providing at least two classification parameters in the packet, each said classification parameters having a value; (b) providing each filter with an allowable range for each of the values; and, (c) seeking among said filters, at least one filter that is stabbed by the values, using a KD-tree data structure.

The object of the invention is to provide a general algorithm that quickly (sub-linearly) classifies a packet with a relatively large number of parameters (e.g.. 5 or 6) while requiring a near linear amount of space. The algorithm combines, integrates and fine-tunes several classical data-structures known in computational geometry into an engine for fast packet classification. Part of the integration exploits special properties of IP traffic to facilitate the classification.

Other objects of the invention will become apparent upon reading the following description taken in conjunction with the accompanying drawings.

BRIEF DESCRIPTION OF THE DRAWINGS

The invention herein described, by the way of examples only with reference to the accompanying drawings wherein.

DETAILED DESCRIPTION OF THE EMBODIMENTS

The present embodiments herein are not intended to be exhaustive and to limit in any way the scope of the invention, rather they are used as examples for the clarification of the invention and for enabling of other skilled in the art to utilize its teaching.

While the invention has been described with respect to a limited number of embodiments, it will be appreciated that many variations, modifications and other applications of the invention may be made.

Prior art methods for solving the packet classification problem and their limitations were described in the background section.

Tile present invention includes the innovative adaptation of a KD-tree data structure algorithm to solve the realistic problem of packet classification. The present invention also includes an innovative combination of several prior art techniques together with the KD-tree into one hybrid data-structure that gives a more efficient general solution which overall consumes a modest amount of space.

The validity and the advantages of the present invention is deduced from the theoretical knowledge of the performance of the elements which constitute the algorithm and is demonstrated by intensive simulation.

As described before, the best theoretical solution to the "stabbing problem" takes $O(loc^K n)$ time. It uses multi-dimensional segment trees and requires $O(n \log^K n)$ space.

While asymptotically, for 17 going to infinity and constant K this is considered a good solution, this solution is impractical for the K and n values that are typical in out problem (K between 4 and 6 and n more than a hundred).

The alternative solution, known in computational geometry as the KD-tree, actually solves the problem by converting it into its dual problem called "orthogonal range searching". In the dual problem we are given n points in 2K dimensions, and the query is to compute which of the points lies inside a given axis parallel box. A data-structure used to solve this problem which we adapt here for the first time, has a query time that is sub-linear in the number of filters n, and when applied in this context it provides a practical alternatives with acceptable performances which requires linear space O(Kn), and can answer a query in $O(n^{1-1/2K})$ time.

Multi-dimensional segment trees provide excellent solution to the problem for K=1,2, but for larger values of K both its space and query time become unacceptable. On the other hand, KD-tree provides good performances for K ≧6 but does not perform as well as the segment tree for K=1,2. Hence, the present invention (before making other practical improvements) includes the combination of the two data-structures to provide a new efficient solution to the packet classification problem.

The segment tree is employed to compute all the filters stabbed by the packet first coordinate (i.e., the destination address) and on these filters we use the KD-tree to classify the packet in the remaining dimensions.

Considering the properties of the stream of packets and the type of values that appear in Internet routers, the data structures can farther be improved. These improvements take advantage of particular properties of the packets as follows:

Traffic distribution: In typical routers on the Internet 70–80% of the packets are HTTP packets, about 5% SMTP, and about 5% are FTP as shown by K. Thompson, G. J. Miller, and R. Wilder, "*Wide-area Internet traffic patterns and characteristics*", in IEEE Network. November/December 1997.

It is thus beneficial to construct special data-structures for packets of those Applications. Those data-structures have two dimensions less since their source-port and destination-port are fixed (80 for HTTP, 21 for FTP etc.).

Protocol type distribution: Similarly, the coordinate of the protocol is most often either TCP or UDP. Thus, according to our method, one first divides the packets by that coordinate and maintain a separate data-structure for each type of protocol as suggested by Srinivasan et al., 1998.

a. Over all Layout of the Classification Method

Figure 1:
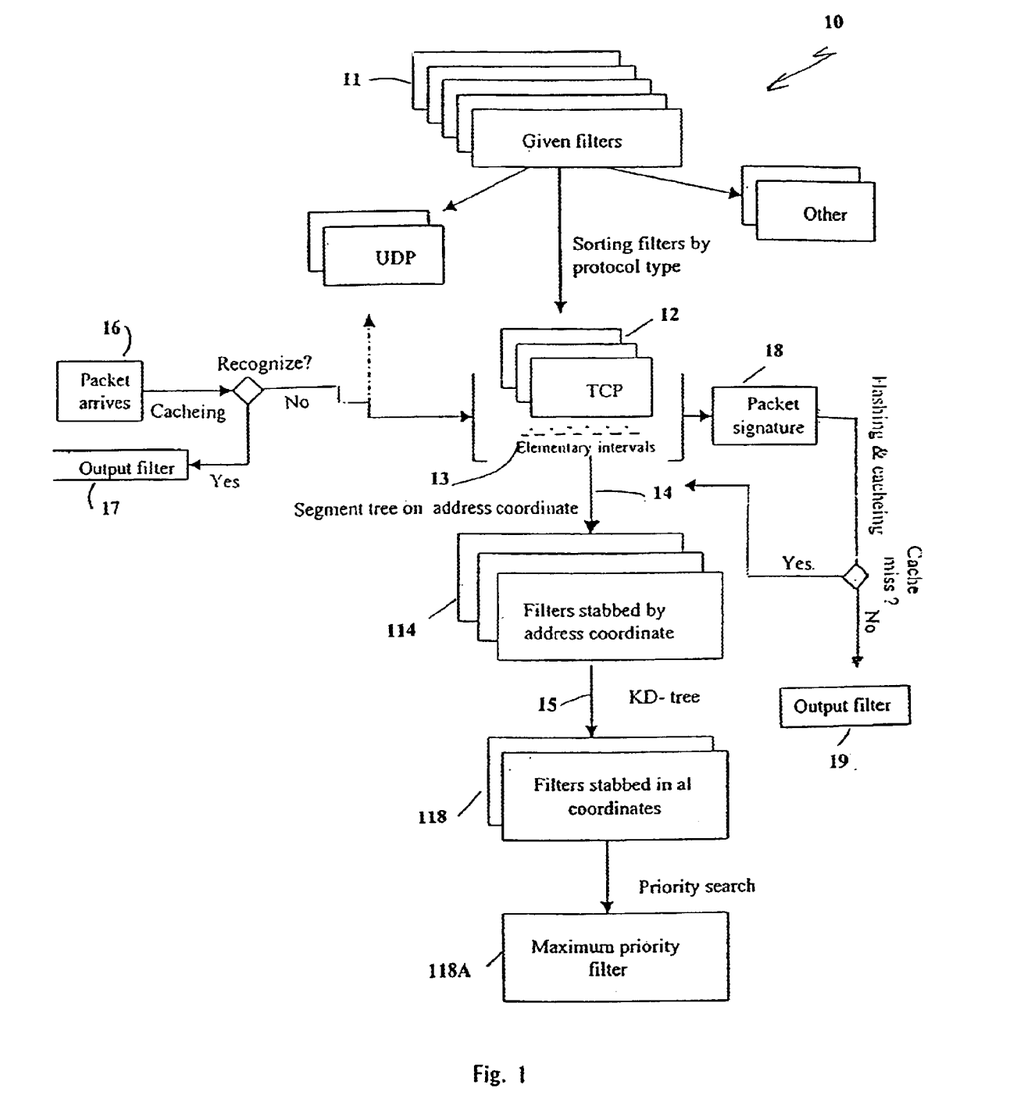
FIG. 1 shows the layout of the algorithm of the invention.

The overall structure of a preferred embodiment 10, of the present invention; the combined scheme, is outlined in FIG. 1. Specific elements in the layout are detailed below.

Given a set of filters 11, in five dimensions, we first construct three different data-structures, one for each value of the protocol type coordinate. Here only the data structure for the TCP protocol type 12, is shown in detail.

In each such data-structure, we compute 13 the elementary intervals, in all 4 remaining coordinates, and then we construct a segment tree 14, over the destination ranges of the filters. For the subsets of filters stored in each internal node of segment tree 14, we construct a KD-tree 15, on the remaining coordinates (using modifications explained below). Thus each internal node of segment tree 14 contains a KD-tree 15 of (5−2)·2=6 dimensions.

When a packet 16, arrives, we first see if a packet with an identical header was handled recently and who was the output filter 17. If this "short range" cacheing procedure misses, we divert the packet according to the packet's protocol coordinate to the appropriate data structure. According to the elementary intervals of the filters 13. we use the algorithm given by: M. Waldvogel, G. Varghese, J. Turner, and B. Plattner. "Scalable high speed IP routing lookups". In *Proc. ACNI SIGCOMM* 97, October 1997 to compute the packet's signature 18, in O(log n) time, (or O(log W) time per coordinate, where W is the logarithm of the maximum value in that coordinate), doing this process of all 5 coordinates of the packet.

We can now use the cache (i.e., using hashing) to check if a similar packet was already handled, if so the algorithm returns the relevant filter 19, immediately.

In case of cache-miss, the packet is classified according to its destination coordinate by a segment tree data structure 14, and then by a KD-tree data structure 15, which is constructed over the remaining 3 coordinates of the filters 114, which were stabbed by the destination address of the packet.

Among the filters 118, which were concurrently stabbed by the values of all 5 coordinates, we apply to the packet 16 the filter With the highest priority. 118*a*.

Thus we can classify, a packet in O(n⅗ log n) time. While this is theoretically unsatisfactory, in practice (because of flows and hashing), it will perform considerably better. See later for the empirical results. Moreover, this structure is simple enough, so that it can be easily programmed, and in practice it is faster than previous approaches (which for "problematic" filters deteriorate to linear-scan). The construction time of the data-structure is $O(n \log^2 n)$ time, with O(n log n) space.

One can further improve the look-up process. For example, one can construct a several data-structure similar to the one described above, so the top segment tree is constructed on a different coordinate in each data-structure. Thus, once the packet signature is computed, we can quickly decide (by looking up in a pre-computed arrays) in which coordinate the packet intersects the smallest number of projected filters. Hence, the classification is now carried out in the segment-tree corresponding to this coordinate. This speed up the classification since the number of filters considered during the secondary stage is smaller.

One might improve the search time by constructing segment-trees also in the second-level of the data-structure (i.e., in the nodes of the top segment-tree over the destinations) instead KD-trees. So that the secondary data-structure used inside a node of the top-level segment tree, is either a KD-tree or a segment-tree. This should be done careful so to avoid an exponential blowup in space (and query time). The intuition being that there might be a few nodes in the top segment-tree that contain a large fraction of the overall filters, and by building a second-level segment-tree we can speedup the overall search time.

It is to be understood that it is possible to use partial combinations of the classification elements of embodiment 10. Thus e.g., the procedures of sorting filters according to the protocol of the packet and then applying a KD-tree in (5−1)·2=8 dimensions, or using exclusively a KD-tree in 5·2=10 dimension for the packet classification, are included within the scope of the invention.

b. Elements of the Data structure of the Invented Method

The present invention includes innovative adaptation and combinations of prior art procedures of searching and classification, which exist in the solution of the "stabbing problem" and its dual "range-searching" problem.

Preprocessing an ordered set of n, axis parallel boxes $B_1 \ldots, B_U$, so that one can decide quickly which is the first box being stabbed by a query point q, is known as the "*stabbing query problem*" (M. de Berg et al., 1995).

As the number of dimensions increases, the problem of orthogonal range searching becomes harder. It is thus preferable to perform the queries in the lowest-possible dimension. We note that in our case, we can immediately gain by reducing the dimension by encoding the protocol coordinate into the data-structure. Namely, we have three data-structures to search in, one for each possible value of the protocol. This increases the space requirement by a factor of three, but reduces the dimension by 1. A similar observation was given by Srinivasan et al., 1998. A related problem is the "orthogonal range-searching problem": We are given an ordered set of points $P=\{p_l, \ldots p_n\}$, and we want to preprocess them, so that given an axis parallel box B, we can quickly compute the points of P contained inside B.

b.1 Segment-trees

One solution for the (orthogonal) stabbing query problem is segment-trees (J. L. Bentley, 1977). Let assume that our input is a set of one dimensional intervals $S=\{S_l, \ldots, S_n\}$ i.e. one dimensional tilters) 21. as shown in FIG. 2B. We want to preprocess S so we can quickly perform stabbing queries. Namely, for a value $\chi_o$, e can quickly compute all the intervals that intersect it.

To do so we break the x-axis in the end points of the intervals. This decomposes the x-axis into elementary intervals. $I=\{I_l, \ldots I_{4n-l}\}$ 23, so that their interior does not contain any projected endpoint. Each such endpoint is considered to be an elementary interval.

Figure 3B:
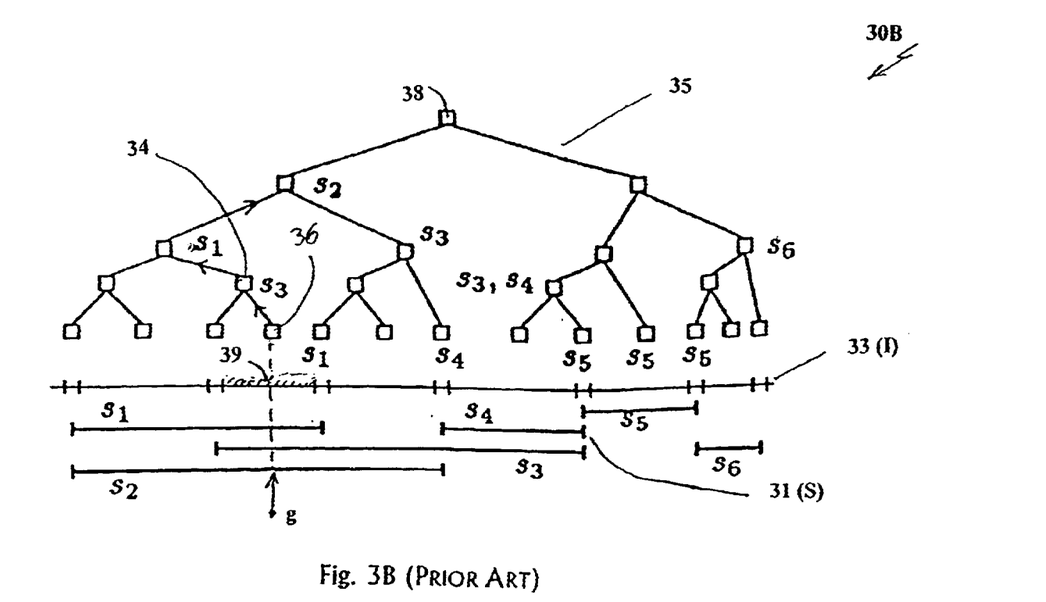
FIG. 3B (prior art) shows construction of a segment tree in 1 dimension.

We now construct a balanced binary tree T 35 on those elementary intervals, 33 as is shown in FIG. 3B.

For a node $\upsilon$ 34, of T 35, let $I_\upsilon$ 39, denote the union of all the intervals leafs belonging to the sub-tree of $\upsilon$. We associate, with leaf of $\upsilon$ 36 a subset $S_{98}$ of $S=\{S_l, \ldots S_n\}$ 31, of all intervals that contain $I_\upsilon$.

A naive way to do so, is to store inside each leaf $\upsilon$ of T, all the intervals of $\{S_l \ldots S_n\}$ that contains $I_\upsilon$ and store no intervals inside each interior nodes. Thus, give a query point q, we can compute all the intervals that contains q by locating the leaf $\upsilon$, such that $q \subseteq I_\upsilon$. Clearly, all the intervals of S that contain q are in $I_\upsilon$. This provides a query time O(log n+k), where k is the number of reported intervals.

The problem is, that in the worst case, this structure will require $\Theta(n2)$ space. We can improve it to O(n log n) space, by doing the following: We store each interval $S_i$ in all the nodes $\upsilon$, such that $I_\upsilon \subseteq S_i$, and $I_{father(\upsilon)} \not\subseteq S_i$. Intuitively, this amounts to raising $S_i$ to the highest possible locations in T. Indeed, if $S_i$ contains the intervals of two siblings u, w, then it is logical to store $l_l$ in the common father of u, w and not in both of them separately. The condition stated above, is a formal definition of those points where this process of "raising" $I_l$ can not be continued.

It is easy to verify that an interval $S_i$ will be stored at most twice in each level of the tree. Thus, each interval will be stored O(log n) times in nodes of T, and the overall space required is O(n log n).

Consider a query point q, let $\upsilon$ be the leaf of T such that $I_\upsilon$, contains q. It is easy to verify that any interval $S_i$ that contains q must be stored somewhere along the path from $\upsilon$ to the root 38, of T. Moreover, $S_i$ is stored in such a path only once. Thus, the set of all intervals that contains q, is the disjoint union of sets of intervals stored in the nodes along this path. Thus, this modified data-structure can answer a stabbing query in 0(log n+k) time.

This structure is known as segment-tree (M. de Berg et al., 1997). Segment-tree can be constructed in O(n log n) time. This structure can be extended to arbitrary dimension, by repeating the construction recursively for the set of intervals stored inside each internal node of T so that the search in the second level structure is performed on the second coordinate, and so on.

Overall, such multi-dimensional segment-trees provide $O(\log^K n+k)$ query time, and requires $O(n \log^K n)$ space. This can be further improved (by a logarithmic factor) using fractional cascading (M. de Berg et al., 1997). However, a short computation shows, that for n=40000, and K=4 the required number of operations performed by the algorithm for a single query is proportional to $(\log^4 40000)=15^4=50625$, which is larger than the number of operations performed by the naive linear-scan algorithm.

We should also observe that segment trees posses a very useful property: We can compute, in logarithmic time, 2 log n disjoint subsets of filters so that their union is the set of all filters, such that their projection (to a certain axis) contains our query point projection. Thus, just using a single-level segment tree, and performing linear scan on each of those subsets, will speed up query time considerably when compared to the naive linear scan.

b.2. Reducing Stabbing Query Problem to Orthogonal Range-Searching

Computing all the boxes that contain a certain point in K-dimensions, can be reduced to computing all the points that are contained inside an axis parallel box in 2K-dimensions, as shown by E. M. McCreight, in "*Priority search trees*", in SIAM. J. Comput., 14(2):257–276, 1985. and by M. de Berg et al., 1995 & 1997.

Figure 4:
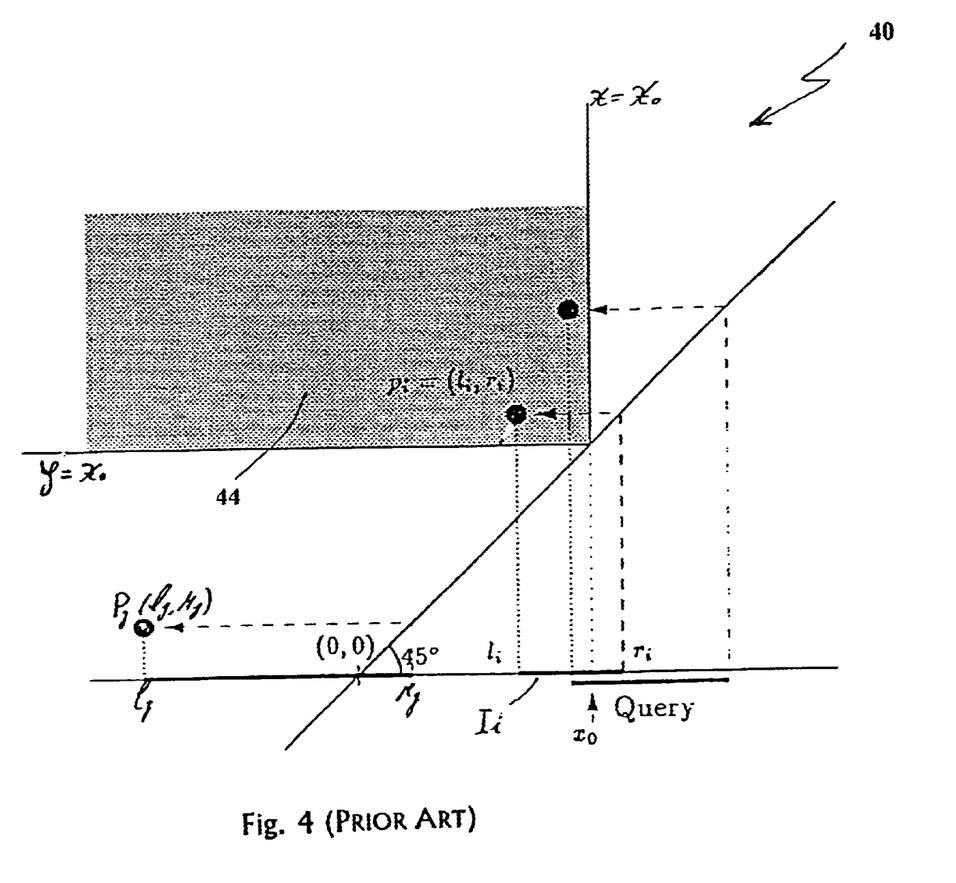
FIG. 4 (prior art) shows the conversion of the "stabbing query problem" in 1 dimension into the "orthogonal rang searching" problem in 2 dimensions.

We first demonstrate this reduction in FIG. 4 for the one dimensional case. We have a set $\{[l_l,r_l], \ldots [l_n,r_n]\}$ of intervals (i.e., one dimensional boxes). An interval $[l_i,r_i]$ contains a point $x_o$, if $l_i \leq x_o \geq r_i$. In the transformed problem, we map $[l_i,r_i]$ to the point $p_i=(l_i,r_i)$.

Clearly, the point $x_o$ intersects interval $I_i[l_i, r_i]$, if and only if, the point $p_i$ lies, in the transformed problem, to the left of the vertical line $x=x_o$, (i.e., $l_i \leq \chi_o$), and $p_i$ lies above the horizontal line $y=x_o$, (i.e., $r_i \geq x_o$).

Thus, all the intervals that contain $x_o$ correspond to all the points p, that lie to the left and above the point $(x_o, x_o)$, shown as shaded area 44 in FIG. 4. Doing this to each coordinate of a given filter, results in a point in 2K-dimensions. The packet we want to classify is transformed into an octant (i.e., an axis-parallel box, such that its projection to each axis is a ray). The highest priority filter containing the point, is the highest priority mapped point inside the resulting octant.

b.3. KD-tree

For a given set $S=\{p_l, \ldots p_n\}$ of n. points in $IR^K$, it is sometimes useful to be able to answer orthogonal range-searching queries on S; namely, given an axis parallel query box B in $IR^K$, one would like to "quickly" determine the subset of points of S lying inside B.

A KD-tree is an orthogonal range-searching data-structure which supports O(n log n) preprocessing time, $O(n^{I-K})$ query time, and O(n) space.

The KD-tree is a binary tree constructed as follows: we compute the point $p_i$ of S such that its first coordinate is the median value among $p_i^I \ldots, p_n^I$ where $p_i^k$ denotes the k-th coordinate of the j-th point of S; i.e., [½] points have a value smaller than $p_i$, and [½] points have a value larger than $p_i$.

Figure 5:
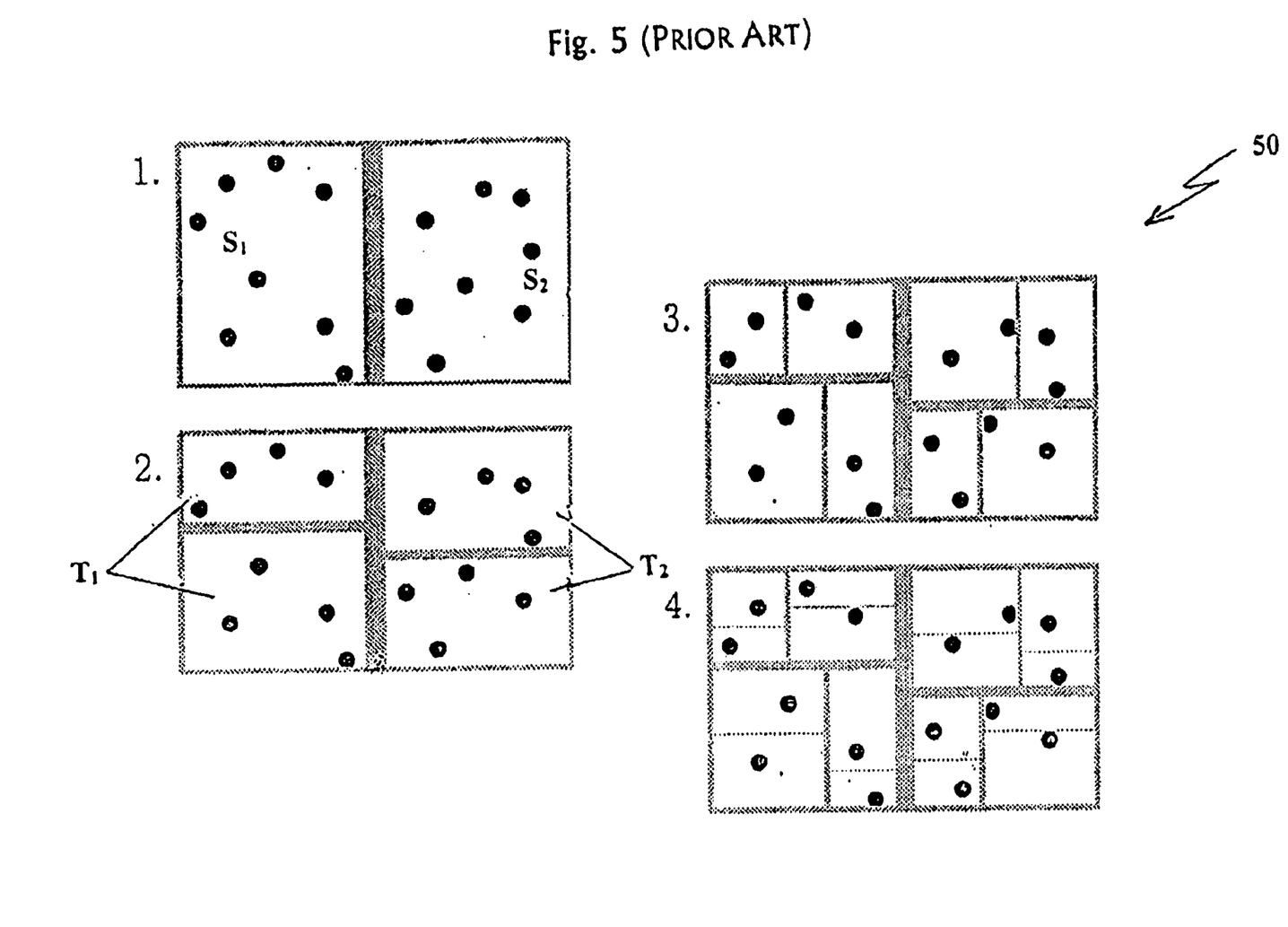
FIG. 5 (prior art) shows the partition of a set of points induced by a KD-tree of the points.

Let $S_I$ as shown in FIG. 5, denote all the points of S with first coordinate smaller than $p_i$'s first coordinate, and let $S_2$ $S\backslash S_1$. Let $T_1$ and $T_2$ be the KD-trees constructed recursively for $S_1$ and $S_2$, respectively.

The KD-tree of S is simply the binary tree having $T_1$ as its left sub-tree and $T_2$ as its right sub-tree. We apply this algorithm recursively, splitting the sets in the i-level of the KD-tree using the median point in the k-th coordinate, where k=(i mod K)+1. Namely, each K levels we perform the partition in the same coordinate. The resulting data structure has linear size, O(n log n) preprocessing time, and can answer a query in $O(n^{1-1/K}+k)$ time, where k is the size of the query output.

In addition, we store in each node u of the KD-tree the bounding box of all the points stored in the sub-tree of υ. Given a query box B, we compute all the points inside B, by starting from the root of T and applying the following recursive procedures: If the bounding box $B_υ$ of the current node v is contained inside B, report all the points in the sub-tree of υ.

If $B_υ$ intersects B, then go recursively into the left and right sons of υ. Otherwise. B and $B_υ$ do not intersect, and we abort the search in this sub-tree.

b.4 Modifying KD-trees to the Present Invention

We want to find the highest priority point lying inside the query octant (i.e., the highest priority filter containing the packet). To facilitate this, we store in each node the highest priority point stored in this sub-tree. Thus, if the bounding box of the node is contained inside the query octant, we can abort the search in this sub-tree, returning the highest priority point stored in this sub-tree as a candidate for the required filter. Thus, we have the following according to M. de Berg et al., 1997:

Lemma 3.1 For a set S of n filters in K-dimensions, one can preprocess S in O(n log n) time, so that one can decide for a query packet, which is the filter of highest priority that contains it, in $O(n^{1-1/2K})$ time.

Note that KD-trees, unlike segment trees, do not suffer from the exponential blow-up in space/time required, due to the high dimension involved.

In fact, KD-trees can be further modified for oui case by noting that unlike the classical setting in computational geometry, our coordinates have discrete values. Thus, the present invention preferably includes the following two modifications:

b.4.1 Dimension Reduction—It might be that all the points in a sub-tree have identical values for some of their coordinates. Namely, all the points in this sub-tree lies on an orthogonal hyperplane. Thus, partitioning in this dimension is counter productive, since we will store all the points either in the left sub-tree or the right sub-tree. Thus, by skipping those unnecessary cuttings we can further improve the query time as the dimension of the points involved drops.

b.4.2 Popular Value—It might be that during the computation of a KD-tree for a node υ, the value $c_υ$, that we use to partition the correct coordinate is very popular (for example, ⅔ of the points have the same value in this coordinate).

The reason such a popular value might arise, is because a lot of the filters might be defined for handling specific usages. For example, filters handling HTTP traffic, will have value 80 in the source port coordinate.

It is beneficial in such cases, to split the KD-tree in the sub-tree rooted in υ into three sub-trees: (i) All the points to the left of $c_υ$ in this coordinate., (ii) all the points to the right of $c_υ$, and (iii) all the points having the value $c_υ$ in this coordinate.

The benefit in such a triple decomposition, is that in the (iii) case the points stored in the resulting sub-tree will benefit from a dimension reduction.

We put together the techniques described above into one hybrid data-structure that gives an efficient general solution and overall consumes a modest amount of space. In the next section, we describe the simulation of the present invention and evaluate its performance by comparison with other prior art methods.

c. Simulation of the Present and its Evaluation

The present invention was simulated and its output was compared to other classification procedures. For the comparison to be indicative we performed all the experiments on the same machine, in the same programming environment. The machine used was a Linux Pentium-II, 450 Mhz, with 512 Mbyte main memory. All the procedures were implemented in C++.

We programmed a prototype to simulate the different classification methods. The code is far from being optimized. Thus it is only relevant to observe the relative speeds of the various tests. Each experiment was repeated six times on 100, 500, 1000, 5000, 10000, and 40000 filters.

We considered 5 parameters filters in all the experiments. Following V. Srinivasan et al., 1998, the filters were generated by randomly selecting a prefix from the route-server table at MAE-EAST as the prefix interval for the destination, similarly selecting a prefix interval for the source range. Uniformly choosing two values between 1 and 1000 and considering the interval between them as the specified range selected each destination-port range, and source-port range. The protocol-type range was randomly selected over {0, 1, and 2}. In each experiment 10,000 packets were randomly selected as follows: a filter was randomly chosen and a packet was uniformly selected from the interior of that filter. A filter having higher priority that also contains this packet might also classify such a packet.

An additional parameter that is considered in the experiments is the probability of a range value in a filter to be of type (*), (i.e., wildcard, any value in that coordinate matches). It was disallowed for both the source and the destination addresses ranges to be (*) at the same filter. As we will see this parameter has considerable influence on the "difficulty" of the classification.

c.1 Methods Tested

Five different methods were tested:

Linear: For each packet the filters were linearly scanned from the highest priority filter to the lowest stopping as soon as a filter containing the packet was encountered.

Segment tree: A segment tree was constructed over the destination ranges of the filters. for each packet the elementary interval stabbed by the packet destination is computed and the filters associated with this interval are linearly scanned.

KD-tree: One KD-tree containing all the filters is constructed as follows: Each filter is converted into a point in 10 dimensions. The query packet is converted into a axis-parallel box in 10 dimensions and the corresponding orthogonal range searching query is carried out on the KD-tree.

KD-tree+Protocol: Three 8 dimensional KD-trees were constructed one for each possible protocol-type. Each arriving packet was directed to the appropriate KD-tree.

Combined scheme: Here, packets are classified first by the protocol-type, then using a segment tree by the destination address, and finally by a 6 dimensional KD-tree.

The results are shown in Table1–Table5.

TABLE 1

The probability for a star is 0%. Queries were performed for 10000 packets

| | Overall Query Time in Seconds | | | | |
|---|---|---|---|---|---|
| Filters | Combined scheme | KD-tree | KD-tree + Protocol | Segment tree | Linear |
| 100 | 0.04 | 0.11 | 0.10 | 0.02 | 0.06 |
| 500 | 0.03 | 0.28 | 0.20 | 0.02 | 0.46 |
| 1000 | 0.05 | 0.39 | 0.25 | 0.03 | 1.23 |
| 5000 | 0.06 | 1.03 | 0.51 | 0.04 | 6.78 |
| 10000 | 0.07 | 1.47 | 0.66 | 0.04 | 13.62 |
| 40000 | 0.09 | 2.86 | 1.18 | 0.05 | 54.53 |

TABLE 2

The probability for a star is 10%. Queries were performed for 10000 packets

| | Overall Query Time in Seconds | | | | |
|---|---|---|---|---|---|
| Filters | Combined scheme | KD-tree | KD-tree + Protocol | Segment tree | Linear |
| 100 | 0.05 | 0.20 | 0.16 | 0.03 | 0.06 |
| 500 | 0.10 | 0.72 | 0.45 | 0.06 | 0.47 |
| 1000 | 0.16 | 1.13 | 0.70 | 0.13 | 1.29 |
| 5000 | 0.43 | 3.56 | 1.88 | 1.40 | 6.81 |
| 10000 | 0.62 | 5.64 | 2.67 | 2.72 | 13.58 |
| 40000 | 1.39 | 11.59 | 5.39 | 10.47 | 54.90 |

TABLE 3

The probability for a star is 20%. Queries were performed for 10000 packets

| | Overall Query Time in Seconds | | | | |
|---|---|---|---|---|---|
| Filters | Combined scheme | KD-tree | KD-tree + Protocol | Segment tree | Linear |
| 100 | 0.05 | 0.23 | 0.17 | 0.03 | 0.07 |
| 500 | 0.16 | 0.85 | 0.45 | 0.13 | 0.48 |
| 1000 | 0.27 | 1.36 | 0.93 | 0.35 | 1.26 |
| 5000 | 0.64 | 4.18 | 2.20 | 2.38 | 6.92 |
| 10000 | 0.88 | 6.43 | 3.31 | 4.90 | 13.72 |
| 40000 | 2.19 | 14.90 | 7.16 | 19.33 | 55.01 |

TABLE 4

The probability for a star is 30%. Queries were performed for 10000 packets

| | Overall Query Time in Seconds | | | | |
|---|---|---|---|---|---|
| Filters | Combined scheme | KD-tree | KD-tree + Protocol | Segment tree | Linear |
| 100 | 0.06 | 0.27 | 0.21 | 0.03 | 0.06 |
| 500 | 0.20 | 0.93 | 0.62 | 0.17 | 0.48 |
| 1000 | 0.27 | 1.53 | 0.98 | 0.42 | 1.29 |
| 5000 | 0.81 | 5.31 | 2.69 | 3.17 | 6.92 |
| 10000 | 1.10 | 8.00 | 3.78 | 6.26 | 13.75 |
| 40000 | 2.37 | 18.19 | 7.86 | 25.53 | 53.81 |

TABLE 5

The probability for a star is 100%. Queries were performed for 10000 packets

| | Overall Query Time in Seconds | | | | |
|---|---|---|---|---|---|
| Filters | Combined scheme | KD-tree | KD-tree + Protocol | Segment tree | Linear |
| 100 | 0.07 | 0.12 | 0.13 | 0.05 | 0.07 |
| 500 | 0.13 | 0.27 | 0.28 | 0.45 | 0.57 |
| 1000 | 0.15 | 0.31 | 0.33 | 1.24 | 1.25 |
| 5000 | 0.20 | 0.48 | 0.50 | 6.70 | 7.31 |
| 10000 | 0.17 | 0.43 | 0.50 | 13.21 | 14.28 |
| 40000 | 0.25 | 0.72 | 0.68 | 53.68 | 48.11 | c.2. Result Analysis

Packet classification using the procedures of; KD-tree, The KD-tree+protocol and the combined scheme are included in the scope of the present invention. The most remarkable aspect of the results given in the tables is that the combined scheme, which is included in the scope of the present invention almost always wins against all the other methods. Furthermore, it performs by one or two orders of magnitude faster than the naive linear method.

Also the KD-tree and the KD-tree+protocol methods perform better than prior art methods (the linear scan and the multi-segment tree) for large number of filters ($n \geq 5000$), except when the probability for a star- (*) is 0%.

Notice that as the probability of a star- (*) decreases the probability of two filters to intersect is also decreasing. In particular with probability zero for a star (see Table 1) there are almost no intersections even when the filters are projected on the destination coordinate. This phenomenon is caused partially because of the way prefixes are aggregated in IP routing tables. In this case the multi-dimensional filter classification problem reduces to one dimensional classification over the source or destination coordinate. It is thus no surprise that the segment tree method is the clear winner in that case (doing a simple binary search on the destination coordinate), the combined scheme lags somewhat behind, and all the other methods are far behind. As the probability of a star- (*), increases the relative performances of the segment tree method deteriorates and that of the KD-tree improves. For instance when the probability of a star is 100% the segment tree performs as poorly as the linear method.

When the probability for a star is 100% there is only one restricted coordinate, either the source or the destination. Thus it behaves similar to a one dimensional case. The KD-tree takes advantage of this property by operating in 4 dimensions instead of 10. The combines scheme is even better in that case because there the segment tree first handle the destination range and leaves the KD-tree with only the source ranges to deal with. As a final remark notice that as the probability of a star increases the performances of the linear method improves. We believe that the results presented here can be further improved by using the techniques of the present invention in a more aggressive manner.

What is claimed is:

1. A method for classifying a packet according to plurality of filters, comprising the steps of:
   (a) providing at least two classification parameters in the packet, each said classification parameters having a value;
   (b) providing each filter with an allowable range for each value; and,
   (c) seeking among said filters, at least one filter that is stabbed by said values, using a KD-tree data structure.

2. The method as in claim 1 further comprising the steps of:
- (d) assigning each said filter a priority and,
- (e) if at least two of said filters are stabbed by said value; applying to the packet said stabbed filter having a highest said priority.

3. The method as in claim 1 wherein one of said classification parameters is a protocol type of the packet.

4. The method as in claim 3 further comprising the steps of:
- (d) classifying the packet according to said protocol type; and,
- (e) removing said classification parameter, which corresponds to said protocol type, from said KD-tree data structure.

5. The method as in claim 1 further comprising the step of:
- (d) seeking among said filters, at least one filter that is stabbed by said values of said classification parameters, using a second data structure.

6. The method as in claim 5 wherein said one of said classification parameters is selected from the group consisting of destination addresses and source addresses of the packet.

7. The method as in claim 5 wherein said second data structure is selected from the group consisting of binary search, best matching prefix, and segment tree.

8. The method as in claim 5 wherein said seeking via second data structure precedes said seeking via said KD-tree.

9. The method as in claim 8 further comprising the step of:
- (e) removing said one of said classification parameter, from said KD-tree data structure.

10. The method as in claim 1 wherein said packet is provided with between two and five said parameters.

11. The method as in claim 1 further comprising the step of:
- (d) indexing the packet to obtain a packet signature.

12. The method as in claim 11 further comprising the step of:
- (e) hashing said packet signature.

13. The method as in claim 11 further comprising the step of:
- (e) cacheing said at least one of said stabbed filter according to said packet signature.

14. The method as in claim 1 wherein one of said classification parameters is a destination-port of the packet.

15. The method as in claim 14 wherein one of said classification parameters is a source-port of the packet.

16. The method as in claim 15 wherein both said destination-port and source-port are fixed.

17. The method as in claim 16 further comprising the steps of:
- (d) classifying the packet according to traffic distribution of the packet;
- (e) splitting of said KD-tree into a plurality of KD sub-trees, each said KD sub-tree for a different traffic distribution of the packet; and,
- (f) removing said classification parameters, which correspond to said destination-port and source-port, from said KD-tree data structure.

* * * * *